United States Patent Office 3,492,828
Patented Feb. 3, 1970

3,492,828
PROCESS AND APPARATUS FOR HEAT
EXCHANGE OF STREAMS IN THE LOW
TEMPERATURE SEPARATION OF GAS
MIXTURES
Günther Rückborn, Munich-Grunwald, Germany, assignor to Linde A.G. Wiesbaden, Germany
Filed July 19, 1966, Ser. No. 566,414
Claims priority, application Germany, July 20, 1965,
G 44,210
Int. Cl. F25j 5/00, 3/04, 1/02
U.S. Cl. 62—13                                              20 Claims

ABSTRACT OF THE DISCLOSURE

A process for low temperature separation of a raw gas mixture containing one higher boiling component. In the process, the required refrigeration is produced in a refrigeration cycle and the higher boiling component is condensed during cooling of raw gas and subsequently removed from the plant together with the impure separation product to be warmed. Heat exchange is carried out between the raw gas and the separation product and between the compressed cycle gas and expanded cycle gas in the refrigeration cycle together in at least one plate fin heat exchanger. The heat exchanger has a novel sequence of flow paths, a portion of which is cyclically interchanged.

---

This invention relates to a process and apparatus for the low temperature separation of gases, and in particular to a novel heat exchange technique wherein the sublimation of congealed impurities is facilitated.

In the low temperature separation of gas mixtures containing higher boiling components, such as $CO_2$ and $H_2O$, wherein the refrigeration required is produced in a refrigeration cycle, the higher boiling components are congealed and condensed onto heat exchange surfaces during the cooling of the raw gas, and then in a next step are normally carried away from the system by means of warmed impure separation product. For this purpose, so-called self-cleaning heat exchangers are employed, such as regenerators, tube or plate countercurrent heat exchangers.

In order to account for the pressure drop in the system between the entering raw gas, for example air, and the exiting low pressure separation product which is used to sublime the condensed components, the raw gas must be compressed to about 3 to 5 atmosphere absolute. If liquid products are to be produced in the plant by rectification in a single column, this pressure is also sufficient for conducting the rectification, but in the case of rectification within a double column, the air must be compressed to a somewhat higher pressure, i.e., 5 to 6 atmospheres absolute.

In contradistinction to those conventional processes wherein the required refrigeration is provided by compression of the raw gas to a high pressure, for example 150–200 atmospheres, and subsequent expansion, partially in a throttle valve and partially by engine expansion, i.e., expansion with the production of external work, the refrigeration in the precedingly described low pressure processes is produced by a special refrigeration cycle, particularly if the separation products are to be withdrawn in the liquid phase. The circulating medium for this refrigeration cycle is in most cases the raw gas itself, or else one of the separation products, such as nitrogen from an air separation system.

The refrigeration output from this refrigeration cycle increases as the over-all pressure level and the ratio between final pressure and intake pressure of the circulation compressor increase. Since air at a higher pressure has a higher specific heat than air at a lower pressure, it is possible, when heat exchanging equal amounts of high pressure gas with expanded gas in a single cycle, to cool the high pressure gas by a smaller temperature differential than the expanded gas is heated, i.e., the high pressure gas exits at the cold end of the heat exchanger in a warmer state than the expanded gas enters. The turbine entrance temperature of the compressed circulating gas is thus somewhat increased.

At a higher temperature, however, with the same pressure ratio, the circulating gas entering the turbine at a higher temperature can also produce more refrigeration. Increasing the turbine entrance temperature therefore conserves energy and furthermore prevents expansion into the wet vapor region; this effect is more pronounced, the higher the pressure level of the refrigeration cycle. If, additionally, the pressure ratio is increased, the refrigeration output is likewise increased.

For these reasons, it has been considered desirable heretofore to use as high a cycle pressure as possible. Because the specific heat varies with pressure, the temperature diagram of the heat exchange between compressed circulating gas and expanded circulating gas is considerably different from the temperature diagram of the heat exchange between raw gas and separation products. This discrepancy results in a problem in those instances where heat transfer and mass transfer are conducted simultaneously, for example, in the congealing of $H_2O$ and $CO_2$ during the cooling of the raw gas and the sublimation of the same components during the heating of the separation products. Therefore, there have heretofore been provided separate heat exchangers for heat exchange between raw gas and separation products, on the one hand, and for heat exchange between the compressed and the expanded cycle gas, on the other hand. In other words, expanded cycle gas was heated countercurrently by only compressed cycle gas, and raw gas was cooled countercurrently by the separation product. However, in such a process entailing separated heat exchange systems, the congealed components deposited during the raw gas cooling step could not be completely removed by heat exchange with separation product which is to be warmed. Rather, a so-called ice cake is always formed, i.e., in the case of air, a layer of unsublimatable solid $CO_2$ and $H_2O$. This layer—the thickness of which increases to a dimension probably determined substantially by the gas velocity—decreases the rate of heat transfer and increases the pressure drop.

An object of this invention, therefore, comprises improvements in the heat exchange operation in those gas separation processes or apparatuses having a refrigeration cycle, whereby congealed impurities are sublimed more completely.

Upon further study of the specification and claims, other objects and advantages of the present invention will become apparent.

To attain the objects of the invention, there is provided, in a gas separation process having a refrigeration cycle, a single heat exchanger through which are passed raw gas, separation products, compressed cycle gas, and expanded cycle gas.

Referring now to the attached drawings, they represent preferred specific embodiments of the invention and are described briefly as follows:

FIGURES 1, 2, and 3 are schematic flowsheets of air separation plants.

Figure 4:
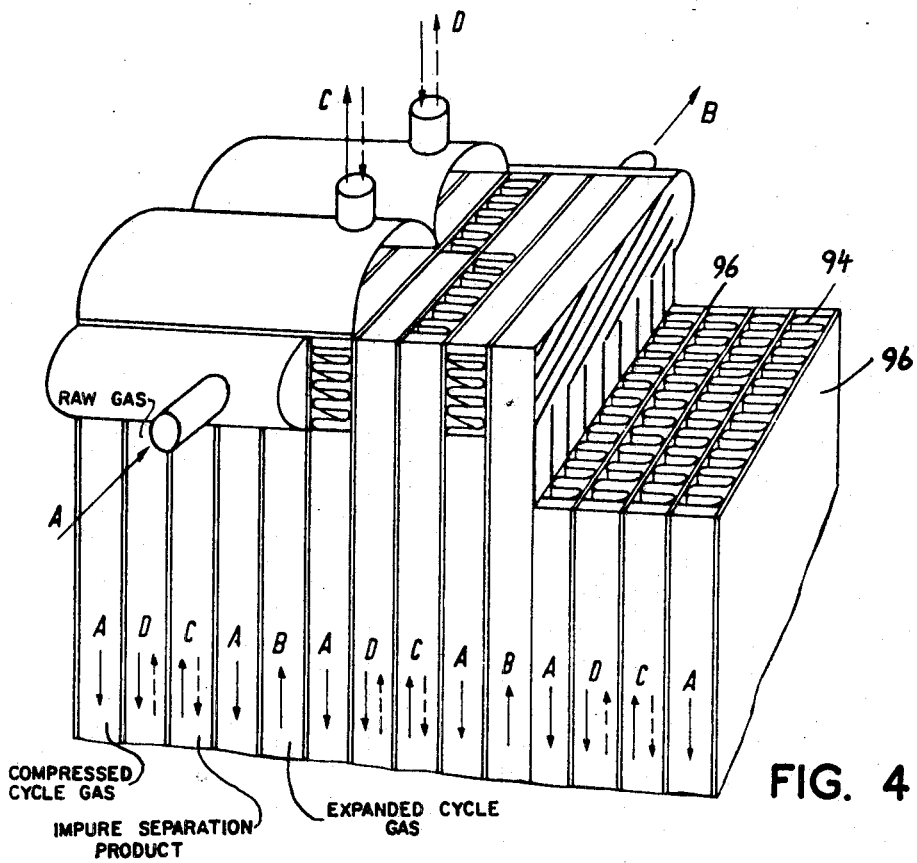
FIGURE 4 is a section partially cut away of a plate fin heat exchanger, and particularly illustrating the sequence of the flow paths of the streams to be heat exchanged therein, as well as the flow direction of each stream.

For purposes of clarification, attention is first directed to FIGURE 4 which illustrates the preferred type of heat exchanger for use in the process of the present invention. In this plate fin heat exchanger, a plurality of fins 94 extend in heat exchange relation between adjacent plates 96 to provide a passage for one or more fluids between each pair of plates.

Whereas the invention is directed to the use of plate fin heat exchangers, other equivalent heat exchangers can be used.

In accordance with the invention, the heat exchange between raw gas and separation product, and the heat exchange between compressed cycle gas and expanded cycle gas is carried out together in at least one plate fin heat exchanger having a sequence of flow paths as follows:

$$\ldots A-[D-C]_n-A \ldots$$

wherein:

D represents the flow path of raw gas stream,

C represents the flow path of impure separation product, and

A represents the flow path of compressed cycle gas, $n$ being at least 1, and preferably 1 to 30, and the dash (−) in the above formula representing a common heat exchange surface.

In the above heat exchange sequence, only the flow paths C–D are cyclically interchanged, and the expanded cycle gas B, as well as, if desired, pure separation product can be warmed by passing the same in a non-interchangeable flow path, each of the latter flow paths being positioned between two of the above sequences of heat exchange paths.

If there is to be withdrawn from the plant, in addition to the impure separation product, only liquid separation product, the flow paths of the streams are connected as follows:

$$\ldots A-[D-C]_n-A-B-A-[D-C]_n-A-B \ldots$$

wherein $n$ is 2, and A through D have the above-indicated meanings.

When it is desired to warm pure separation product E, this stream is heat exchanged respectively between the flow paths A and B, as in the following sequence of flow paths (FIG. 5):

$$\ldots A-[D-C]_n-A-B-E-A-[D-C]_n-A-B-E \ldots$$

In a preferred embodiment of the present process, the flow paths C and D are interchanged when a deleterious amount of condensate has been deposited in flow path D. In this mode of operation, the flow paths A, B and E are not interchanged.

In the above sequence of flow paths, the value of $n$ is dependent upon the ratio of the quantity of raw gas to the quantity of cycle gas. For example, in plants yielding only liquid product, $n$ is generally 1. If, on the other hand, the production of pure gaseous separation product is additionally desired, the ratio of the quantity of raw gas to the quantity of cycle gas is advantageously increased; consequently, $n$ in the above formula is greater than 1.

By carrying out the heat exchange between streams in the above-described sequence wherein there is sandwiched between flow paths constantly fed with warm compressed cycle gas at least one pair of the C–D flow paths which are periodically alternated between raw gas and impure separation product, the congealed impurities are completely sublimed. This advantageous effect is facilitated by maintaining the temperature of the cycle gas between the temperature of the raw gas and the temperature of the impure separation product.

When only one pair of flow paths C–D lie between adjacent warm flow paths A, such as when $n=1$, complete sublimation of congealed impurities is ensured. Even in cases where $n$ is 2 or greater, and the heat exchanger contains flow paths C and D which do not border on a cross section A, there is still an over-all 50% improvement in removal of the ice cake over the conventional processes. Moreover, in small capacity plants, the improvement in the removal of congealed impurities can be attained in a single plate fin heat exchanger; however, in larger plants, it is often desirable to employ two or more of these heat exchangers.

The improved heat exchange system of the present invention can be used in plants having either an open or closed refrigeration cycle. A closed refrigeration cycle is preferred where it is not possible to employ, as the cycle medium, a gas or gas mixture produced in the course of the separation process. It is particularly advantageous to use the raw gas, or one of the separation products, as the circulating medium. In such cases, the medium is circulated in an open cycle and the intake pressure of the circulation compressor is maintained at most no higher than the pressure of the rectification system. Leaks within the cycle can then be compensated for from the separation system, without an additional compressor. Additionally, the pressure differential between the systems in heat exchange with each other according to the invention, i.e., raw gas—separation product, and expanded cycle gas—compressed cycle gas, is maintained as small as possible, thereby to further facilitate sublimation of congealed impurities.

In order to maintain the intake pressure of the compressor lower than the separation pressure, the gas stream flowing from the gas separation system into the cycle system can be throttled. In this system, when additional refrigeration is needed suddenly, the intake pressure of the circulation compressor can be increased by simply reducing the amount of throttling.

In practice, the discharge pressure of the cycle compressor is carefully regulated to optimize the over-all process. As described hereinbefore, thermodynamic considerations dictate the use of at least a minimal discharge pressure. Since the specific heat of the gases in heat exchange varies with pressure, there is also a practical upper pressure limit. The size of the plant is also of practical importance in the control of the discharge pressure of the circulation compressor; in smaller plants, it being desirable to employ pressures which can be efficiently effected in only a one-stage compression step. At the same time, a sufficiently high pressure should be used to permit expansion of the gases in an expansion turbine. Because of the pressure differential employable in the present invention, which is small as compared to the known processes, the quantity of cycle gas must then be correspondingly increased in order to provide the required refrigeration energy. With increased quantities of cycle gas, it is thus possible to employ an expansion turbine. Taking these design criteria into account, the cycle gas at 2–8 atmospheres absolute is desirably compressed in the cycle to preferably 7–26 atmospheres absolute, more preferably 11–15 atmospheres absolute. To minimize the work input to the plant, the compressor of a gas turbine is used to compress raw gas, and the circulation compressor is driven by the gas turbine.

In a preferred embodiment of the invention, a portion of the compressed cycle gas, before being cooled, is split off from the main stream and passed through the expansion turbine. By splitting off a portion of the cycle gas, the refrigeration required to cool the remaining cycle gas is reduced, and the temperature at the cold end of the heat exchanger is lower. Consequently, additional refrigeration is available to cool raw gas and to reduce, at the same time, the partial pressure of the $CO_2$ even further. Also, the turbine entrance temperature is increased.

As described hereinabove, the process is advantageously conducted in one or several plate fin heat exchangers, each of which is connected to the gas separation system, as well as to the cycle system, in such a manner that the individual flow paths are positioned side-by-side as follows:

... A–[D–C]$_n$–A–B–(E)–A–[D–C]$_n$–A–B–(E)–A ...

the flow paths C and D being provided with automatic valves and check valves. In the refrigeration cycle, the gases are preferably expanded in an expansion turbine.

In another preferred embodiment, the apparatus comprises one conduit leading from the gas separation system into the cycle conduit coming from the expansion turbine, and another conduit branching off, in front of the expansion turbine, from the cycle system and ending in the separation system. Preferably, a throttle valve is positioned in the one conduit coming from the separation system.

In yet another embodiment of this invention, that portion of the plant in which raw air and circulation compression occurs comprises essentially a circulation compressor driven by the gas turbine, preferably a one-stage rotary compressor, and a gas turbine having an integral compressor therein which thus eliminates the need for a separate raw air compressor. It is also desirable that a conduit is split off from the conduit carrying compressed cycle gas, at an intermediate point of the plate fin heat exchanger, and extends to the expansion turbine.

Figure 2:
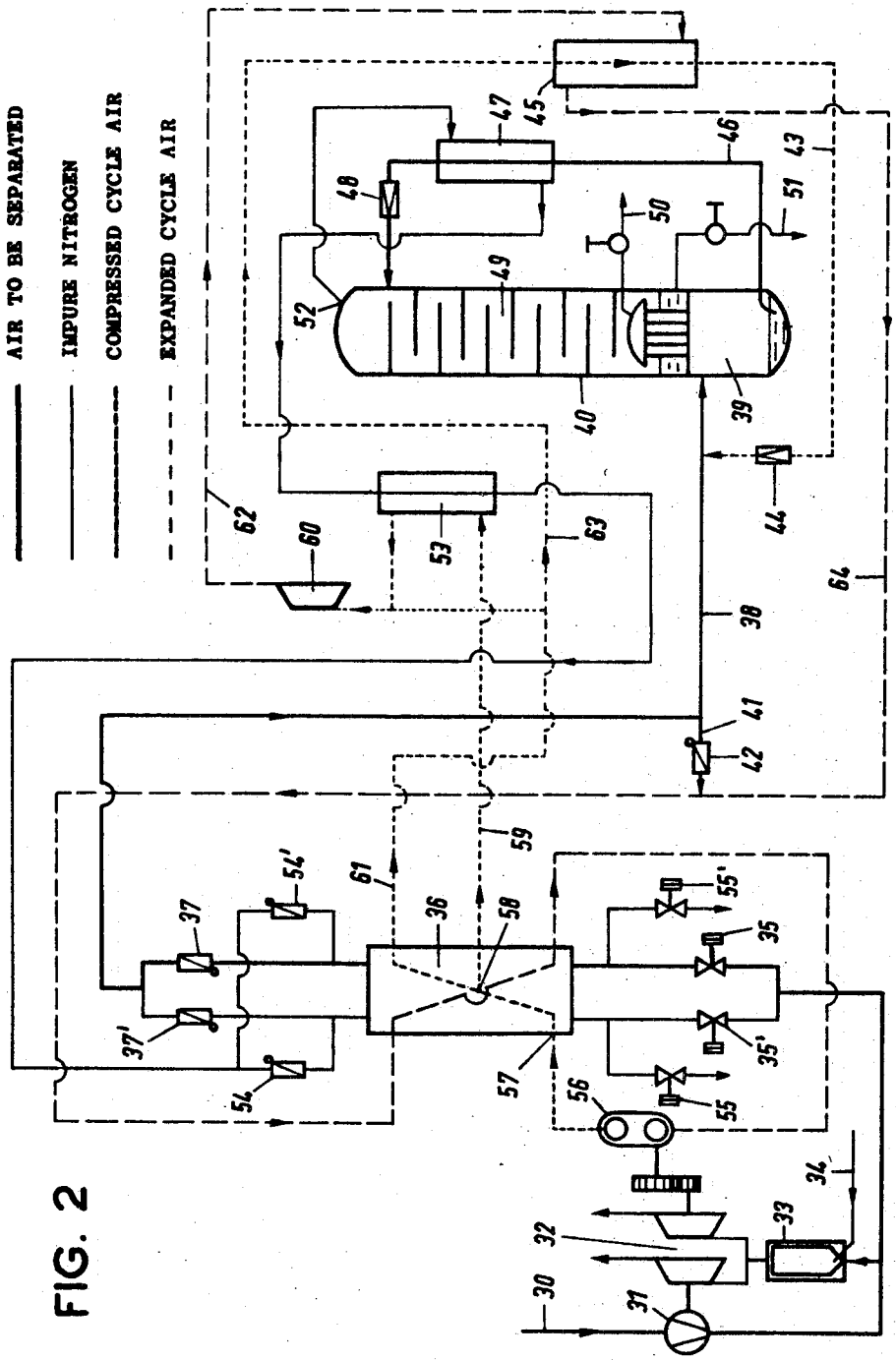
FIGURE 2 shows a liquid oxygen plant using air as the cycle medium.
Figure 3:
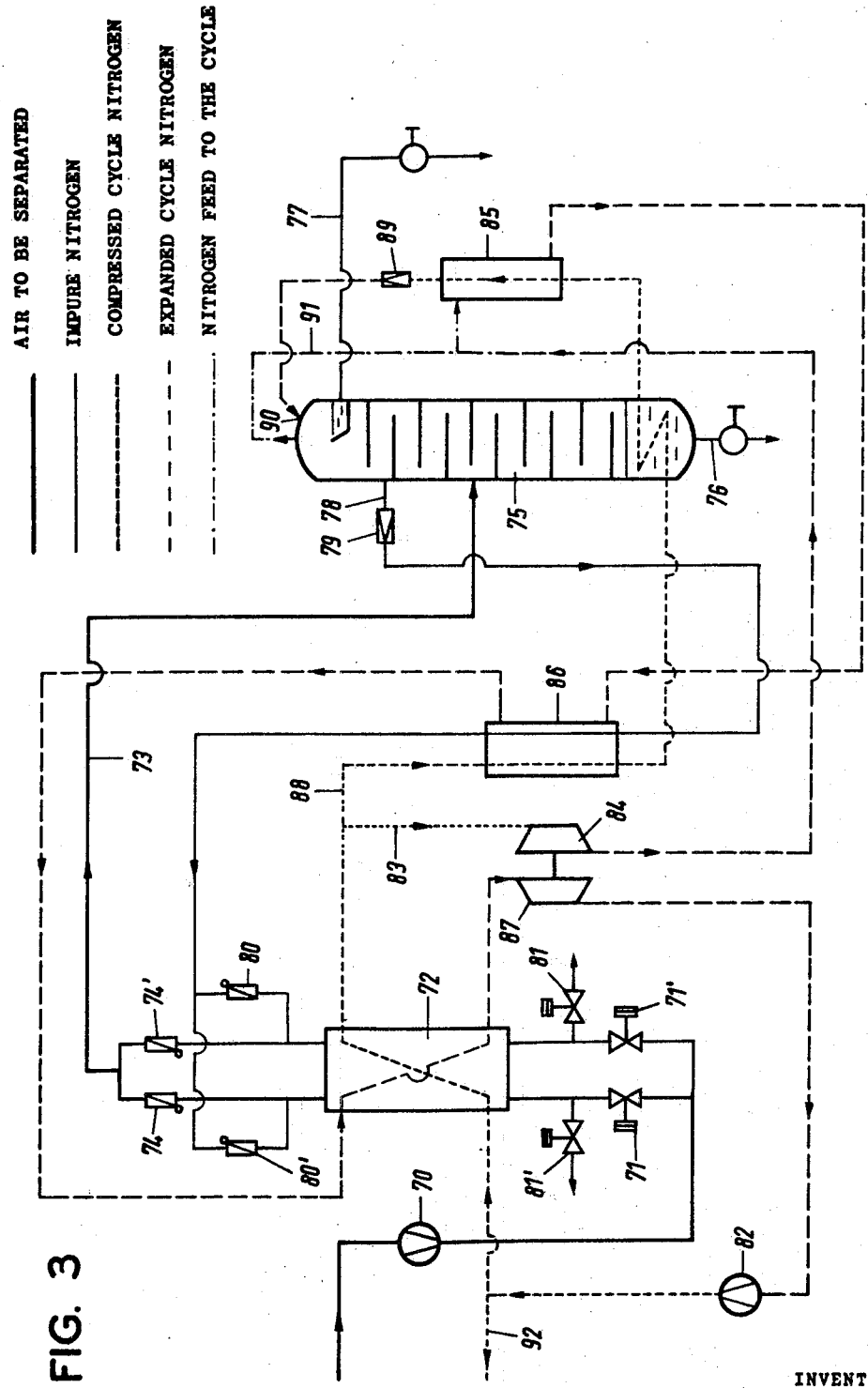
FIGURE 3 illustrates a system for the production of liquid nitrogen, as well as liquid oxygen, the circulating medium being nitrogen.

The process and the apparatus of the invention will now be described in greater detail with reference to three preferred embodiments illustrated schematically in FIGURES 1 to 4. In FIGURES 2 and 3, the scavenging gas is impure nitrogen. For purposes of clarity, the conduit carrying the raw gas D, namely the air to be separated, is in a bold line, the conduit for scavenging gas C is less bold, the conduit for compressed cycle gas A is dashed, and the conduit for expanded cycle gas B has long dashes. The nitrogen feed into the cycle is in dot-dash lines in FIGURES 1 and 3.

Figure 1:
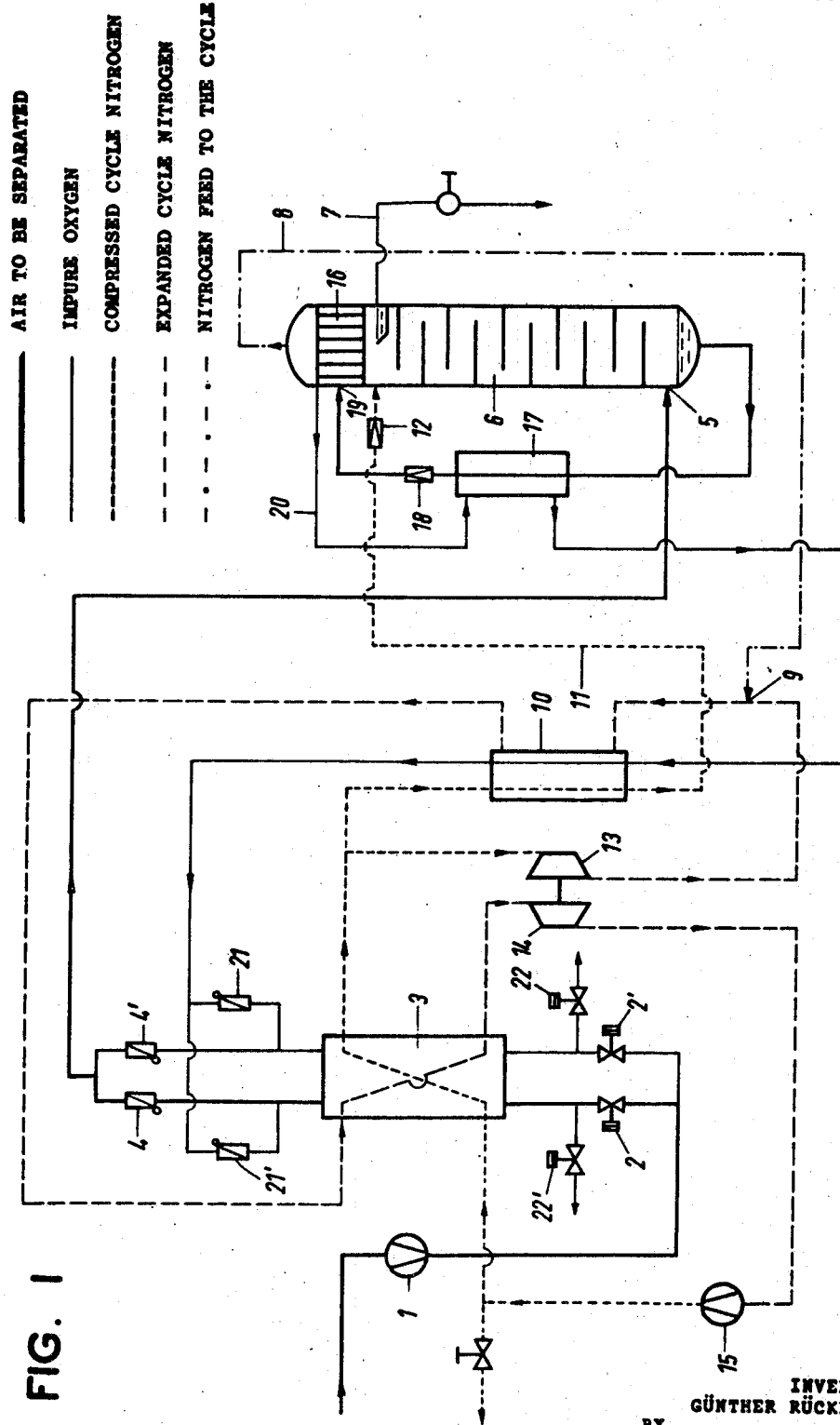
FIGURE 1 illustrates a system for producing liquid nitrogen wherein nitrogen is employed as the cycle gas and the scavenging gas is impure oxygen.

An example of a gas separation plant utilizing the heat exchange process of the present invention is shown in FIGURE 1 wherein atmospheric air is compressed, in a one-stage compressor 1, to about 4 atm. abs., cooled with water, conducted, via the automatically controlled switching valve 2 or 2', into reversible heat exchanger 3, and cooled therein to about 130° K. The resultant cooled air is conducted via automatic check valve 4 or 4' into separating column 6 at point 5, wherein it then rises and is rectified in countercurrent relation to the descending liquid. The practically pure gaseous nitrogen rising in the upper section of the column leaves the uppermost tray and enters the small tubes of the condenser, where the larger portion of this gas is liquefied, a portion of this liquid being returned as washing liquid to the rectifying trays, and another portion being withdrawn through line 7 as liquid product. The uncondensed gas discharging from the top of the column is added to the cycle gas through conduit 8 at point 9; the quantity of uncondensed gas is as large as the portion of cycle gas liquefied in the countercurrent condenser 10 and expanded via conduit 11 and throttle valve 12, into the head of the column.

The cycle nitrogen expanded in turbine 13 enters countercurrent condenser 10, together with the additional quantity of nitrogen supplied at 9, and the combined nitrogen stream serves to cool the unexpanded portion of the cycle; the latter portion is liquefied during this procedure and thereafter fed, via conduit 11, into column 6. In reversible exchanger 3, expanded cycle gas is warmed to ambient temperature and then passed into compression blower 14 of turbine 13 where it is compressed from about 3.3 atm. abs. to about 3.6 atm. abs. The gas is then conducted into one-stage circulation compressor 15 where it is further compressed to about 12 atm. abs. After cooling in a water cooler, the cycle gas is passed through reversible exchanger 3 where it is further cooled to about 128° K. and then expanded in turbine 13 to about 3.6 atm. abs. The latter adiabatic expansion serves to liquefy nitrogen and compensate for heat losses in the system.

The condenser 16 in column 6 is cooled by the washing liquid collecting in the sump of the separation column as impure oxygen (about 34% $O_2$). This liquid is supercooled in heat exchanger 17, then expanded in throttle valve 18, and fed, at 19, into the space between the condenser ducts. There, the liquid evaporates and the resultant gas is withdrawn through conduit 20, warmed in heat exchangers 17 and 10, and conducted via check valve 21 or 21' into the reversible exchanger 3. During this process, the gas is warmed above the melting point of congealed impurities so that it can readily carry away the $CO_2$ and $H_2O$. This scavenging gas leaves the reversible exchanger via automatic switching valve 22 or 22' and is discharged into the atmosphere. The chambers carrying moist air are reversed at predetermined time intervals (for example, every eight minutes), and impure oxygen, which serves as the scavenging gas, is conducted therethrough. The reversal of the flow is accomplished by a timing device which can send either magnetic or pneumatic impulses to the switching valves. The chambers through which the cycle gas flows are not exchanged.

In the system schematically illustrated in FIGURE 2, liquid oxygen is produced. For this purpose, about 3,330 Nm³/h. of fresh air are introduced through conduit 30 into compressor 31 of a gas turbine 32, and compressed to about 4.4 atm. abs. Of the original quantity of air introduced, 3,000 Nm³/h. are consumed in the production of energy in gas turbine 32, into whose burner chamber 33 fuel is injected through conduit 34. The remainder of 330 Nm.³/ h. of air is conducted, at a temperature of 312° K., via automatically controlled switching valve 35 or 35', into reversible exchanger 36, cooled therein to 111.5° K., and withdrawn via automatic check valve 37 or 37'. 230 Nm.³/h. of this resultant cooled air are introduced, through conduit 38, into the intermediate pressure portion 39 of the recitification column 40, and the remainder of 100 Nm.³/h. is introduced into the cycle via conduit 41 and expansion means or throttle valve 42.

To maintain a sufficient quantity of air entering the column, and to make up for the air bleed back to the refrigeration cycle via valve 42, cold cycle air liquefied in the countercurrent condenser 45 is introduced via conduit 43 and throttle valve 44 into the air entering the column. By feeding in this liquefied, cold cycle air, the temperature of the air entering the intermediate pressure portion 39 is then at approximately 94° K. Here, the air is practically completely liquefied, at about 3.3 atm. abs. while being maintained in heat exchange with oxygen boiling at about 1.2 atm. abs. The resultant liquefied air is withdrawn through conduit 46, supercooled in countercurrent heat exchanger 47, and expanded, through valve 48, into the head of the low pressure portion 49 of the column 40. A conduit 50 is provided for withdrawing non-condensible gases, such as helium, from the condenser. Rectification of the air is carried out in the low pressure portion 49, at a pressure only slightly above atmospheric pressure, pure oxygen being obtained in the sump. The resultant pure oxygen is withdrawn via conduit 51 as product, in an amount of about 40 $Nm^3/h$.

At point 52 in the head of the column, 290 $Nm.^3/h$. impure nitrogen are withdrawn and heated to 93.5° K. in the supercooling countercurrent exchanger 47, and further in heat exchanger 53 to 106.5° K. The heated impure nitrogen is then conducted, via check valve 54 or 54', into the reversible exchanger 36 where it absorbs the water and carbon dioxide condensed during the preceding cycle. After sublimation of these impurities, the resultant nitrogen stream is discharged through automatic valve 55 or 55'.

The circulating compressor 56—a one-stage rotary compressor—driven by the gas turbine 32, compresses about 1,500 $Nm.^3/h$. of cycle air from a pressure of about 3.4 atm. abs. to about 12 atm. abs. The compressed cycle air is then passed into reversible exchanger 36 at 57 and at a temperature of 310° K. At 58, about 330 $Nm.^3/h$. of the cycle air, at a temperature of about 200° K., are branched off and passed into expansion turbine 60 via conduit 59 and heat exchanger 53. The remaining 1,170 $Nm.^3/h$. are cooled to 110° K. in reversing exchanger 36 and discharged therefrom through conduit 61. Of this amount, 1,070 $Nm.^3/h$. are mixed with the warmer cycle gas from heat exchanger 53, to provide a total of 1,400 $Nm.^3/h$. of feed cycle air, at a temperature of 130° K., to the expansion turbine 60. This cycle air is then expanded to 3.6 atm. abs. in turbine 60 and simultaneously cooled to 97° K. The resultant expanded gas then passes via conduit 62 into countercurrent condenser 45, where it is used to cool the partial stream of 100 $Nm.^3/h$. compressed cycle gas entering through conduit 63. This compressed cycle gas is liquefied in condenser 45 and then passed, via conduit 43 and valve 44, into conduit 38. The expanded cycle gas is passed through conduit 64, mixed with 100 $Nm.^3/h$. of cooled air via valve 42, and the resultant stream introduced into reversible exchanger 36. This latter gas leaves the exchanger at 302° K. and is again passed into the circulation compressor 56.

In the air separation plant shown in FIGURE 3, both liquid nitrogen and liquid oxygen are produced, the operation of the plant being conducted in a manner similar to the operation of the plant in FIGURE 1, with the exception of rectification. In compressor 70, air is compressed to about 4 atm. abs., conducted via automatically controlled switch valve 71 or 71' into reversing exchanger 72 where it is cooled, and then passed, via conduit 73 and automatic check valve 74 or 74', into the rectification column 75. In the sump of this column, pure liquid oxygen is collected which is withdrawn through conduit 76. The liquid nitrogen is withdrawn through conduit 77 from a collection tray positioned in the head of column 75. The scavenging gas used in the reversible exchanger is impure nitrogen which is removed through conduit 78 and expanded in valve 79 to slightly more than 1 atm. abs. This impure nitrogen passes, after being warmed in heat exchanger 86, via automatic check valve 80 or 80', into the reversing exchanger 72, where it absorbs congealed impurities deposited during the preceding period. The impure nitrogen carrying $CO_2$ and $H_2O$ is then discharged from the plant via automatically controlled valve 81 or 81'.

The cycle nitrogen is compressed in compressor 82 to about 12 atmospheres absolute and cooled in reversible exchanger 72. A portion of cycle nitrogen is passed via conduit 83 into expansion turbine 84, where it is expanded to about 3.6 atmospheres absolute. The expanded effluent from turbine 84 is passed through countercurrent condenser 85 to cool compressed cycle gas, is then warmed in exchanger 86 while passing in countercurrent heat exchange with compressed cycle gas. The heated cycle nitrogen is then passed through reversible exchanger 72, into the intake of loading blower 87 of turbine 84. From there, the cycle nitrogen, at a pressure of about 3.6 atmospheres absolute, is again introduced into circulating compressor 82. The remaining portion of compressed cycle gas cooled in reversible exchanger 72 is passed via conduit 88 into heat exchanger 86, cooled therein, and then liquefied partially in the sump of column 75 and then completely liquefied in countercurrent condenser 85. After expansion in valve 89, the liquid cycle gas is introduced into column 75 at 90 as washing liquid. An amount of gaseous nitrogen equivalent to this amount of washing liquid is withdrawn from the head of column 75 and passes through conduit 91, into the cycle gas stream from the expansion turbine; the resultant gas mixture then being passed into countercurrent condenser 85.

If desired, the plant can be operated to also produce gaseous nitrogen. In this instance, the gaseous nitrogen can be withdrawn through conduit 92 behind circulating compressor 82 at a pressure of about 12 atmospheres absolute.

In carrying out the above-described process, it is preferred to utilize a reversible exchanger 3 (FIGURE 1), and 72 (FIGURE 3) having flow paths for four different gases. In each of these exchangers, however, there is provided a chamber system D, and a chamber system C, which chambers are alternately interchanged with air or scavenging gas. The scavenging gas, in case of FIGURE 1, is impure oxygen, and in the case of FIGURES 2 and 3, impure nitrogen. In contrast, the two additional chamber systems A and B are not reversed: In chamber system A, compressed cycle gas flows continuously (FIGURES 1 and 3: nitrogen; FIGURE 2: air), and in chamber system B expanded cycle gas flows continuously.

In FIGURE 4 can be seen the sequence of the flow paths for the four gases through the plate fin heat exchanger. In addition, there is illustrated the manner in which the exchanger can be connected as well as the direction of flow of each stream. The fact that flow paths C and D can be exchanged, but the flow paths A and B cannot be exchanged, is indicated by the dashed arrows at C and D.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a process for the low temperature separation of a raw gas mixture containing at least one higher boiling component, wherein the required refrigeration is produced in a refrigeration cycle, and the higher boiling component is condensed during cooling of raw gas and subsequently removed from the plant, together with impure separation product to be warmed, the improvement which comprises: carrying out the heat exchange between raw gas and separation product, and the heat exchange between compressed cycle gas and expanded cycle gas in the refrigeration cycle together in a single heat exchange zone having a sequence of flow paths as follows:

$$\ldots A-[D-C]_n-A \ldots$$

wherein:

A represents the non-interchangeable flow path of compressed cycle gas in the refrigeration cycle,
C represents the flow path of impure separation product, D represents the flow path of raw gas, n is 1 to approx. 30, and the dash (—) in the above formula represents a common heat exchange surface, with further provision that the flow paths C–D are cyclically interchanged.

2. The process as defined by claim 1 wherein expanded cycle gas is heated in said heat exchanger and the heat exchange is carried out according to the sequence of flow paths as follows:

$$\ldots A-[D-C]_n-A-B-A-[D-C]_n-A-B \ldots$$

wherein:

B represents the flow path of expanded cycle gas in the refrigeration cycle,

A,C,D have the above indicated meaning, n is 1 approx. 30, and the dash (–) represents a common heat exchange surface, with the further provision that A and B are non-interchangeable flow paths.

3. The process as defined by claim 2 wherein pure separation product is heated in said heat exchanger and the heat exchange is carried out according to the sequence of flow paths as follows:

$$\ldots A-[D-C]_n-A-B-E-A-[D-C]_n-A-B-E \ldots$$

wherein:

E represents the flow path of pure separation product,

A to D have the above indicated meaning, n is 1 to approx. 30, and the dash (–) represents a common heat exchange surface, with the further provision that A, B, and E are non-interchangeable flow paths.

4. The process as defined by claim 1, wherein there is employed in the refrigeration cycle a circulating medium selected from the group consisting of raw gas, and one of the separation products; said medium being circulated in an open cycle by a circulating compressor having an intake pressure no higher than the pressure at which raw gas is separated.

5. The process as defined by claim 2, wherein there is employed in the refrigeration cycle a circulating medium selected from the group consisting of raw gas, and one of the separation products; said medium being circulated in an open cycle by a circulating compressor having an intake pressure no higher than the pressure at which raw gas is separated.

6. The process as defined by claim 4, wherein the intake pressure of the circulating compressor is from about 2 to 8 atmospheres absolute, and the discharge pressure is from about 7 to 26 atmospheres absolute.

7. The process as defined by claim 5, wherein the intake pressure of the circulating compressor is from about 2 to 8 atmospheres absolute, and the discharge pressure is from about 7 to 26 atmospheres absolute.

8. The process as defined by claim 6, wherein the discharge pressure of the circulating compressor is from about 7 to 26 atmospheres absolute.

9. The process as defined by claim 6, wherein compressed cycle gas is expanded in an expansion turbine.

10. The process as defined in claim 6, wherein raw gas is compressed in the compressor of a gas turbine having an integral compressor therein, and the circulating compressor is driven by the gas turbine.

11. A process as defined by claim 1 wherein a portion of the compressed cycle gas is branched off from an intermediate section of the heat exchanger and is led to an expansion turbine.

12. A process as defined by claim 9 wherein a portion of the compressed recycled gas is branched off from an intermediate section of the heat exchanger and is led to the expansion turbine.

13. In an apparatus for the low temperature separation of a raw gas mixture containing a congealable impurity, wherein said apparatus comprises a gas separation system and a refrigeration system, the combination which comprises, heat exchange means having a plurality of flow paths therein which effect a more complete removal of congealed impurities from the apparatus, first conduit means between the gas separation system and the heat exchange means to carry impure separation product, second conduit means between the refrigeration system and the heat exchange means to carry compressed cycle gas, third conduit means connected to the heat exchange means to carry raw gas mixture thereto, fourth conduit means connected to the heat exchange means to remove impure separation product therefrom, and fifth conduit means connected to the heat exchange means for removing raw gas therefrom, said first and third conduit means both having therein an automatic valve means to effect the interchange of the flow paths of raw gas mixture and impure separation product through the heat exchanger means, and all of said conduits being connected to said heat exchange means to effect a sequence of flow paths therethrough as follows:

$$\ldots A-[D-C]_n-A \ldots$$

wherein:

A represents the non-interchangeable flow path of compressed cycle gas,

C represents the flow path of impure separation product,

D represents the flow path of raw gas, n is 1 to approximately 30, and the dash (–) in the above formula represents a common heat exchange surface.

14. Apparatus according to claim 13, further comprising a fourth conduit means connected between the refrigeration cycle and the heat exchange means to carry expanded cycle gas, and all of said conduits being connected to said heat exchange means to effect a sequence of flow paths therethrough as follows:

$$\ldots A-[D-C]_n-A-B-A-[D-C]_n-A-B \ldots$$

wherein:

B represents the flow path of expanded cycle gas,

A, C, D have the above indicated meaning, n is 1 to approx. 30, and the dash (–) represents a common heat exchange surface.

15. Apparatus according to claim 14, further comprising a fifth conduit means connected between the gas separation system and the heat exchange means to carry pure separation product, and all of said conduits being connected to said heat exchange means to effect a sequence of flow paths therethrough as follows:

$$\ldots A-[D-C]_n-A-B-E-A-[D-C]_n-A-B-E-A \ldots$$

wherein:

E represents the flow path of pure separation product,

A to D have the above indicated meaning, n is 1 to approx. 30, and the dash (–) represents a common heat exchange surface.

16. Apparatus according to claim 13, wherein the refrigeration cycle comprises an expansion turbine.

17. Apparatus according to claim 16, further comprising a sixth conduit means connected between the gas separation system and the cycle line carrying gases discharging from the expansion turbine, and a seventh conduit means branching off from the intake line of the expansion turbine in the cycle system, and connected to the separation system.

18. Apparatus according to claim 17, further comprising an expansion means in said sixth conduit means.

19. Apparatus according to claim 17, for use in the separation of air, wherein a gas turbine means having a compressor drives a circulation compressor in the refrigeration cycle, the compressor of said gas turbine means being inserted in the inlet line for fresh air, said inlet line being common to the air separating system and the fresh air supply to the gas turbine.

20. Apparatus according to claim 16, further comprising an eighth conduit connected between the flow path in said heat exchange means through which compressed cycle gas is flowing and the inlet line of the expansion turbine.

References Cited

UNITED STATES PATENTS

| 2,534,478 | 12/1950 | Roberts | 62—13 |
| 2,863,296 | 12/1958 | Newton | 62—39 XR |
| 3,062,016 | 11/1962 | Dennis et al. | 62—22 |
| 3,144,316 | 8/1964 | Koehn et al. | 62—26 XR |
| 3,188,823 | 6/1965 | Collins | 62—13 |
| 3,348,384 | 10/1967 | Harmens | 62—38 XR |

WILBUR L. BASCOMB, JR., Primary Examiner

U.S. Cl. X.R.

62—38, 29, 30